United States Patent
Umeda et al.

[15] 3,690,532
[45] Sept. 12, 1972

[54] DEVICE FOR INTERMITTENTLY TRANSPORTING ROLL FILM

[72] Inventors: Kaoru Umeda, Osaka; Kenjiro Ishii, Kanagawa; Hiroshi Endo, Tokyo, all of Japan

[73] Assignee: Minolta Camera Kabushiki Kaisha, Osaka, Japan

[22] Filed: April 12, 1971

[21] Appl. No.: 133,062

[30] Foreign Application Priority Data

April 16, 1970 Japan..................45/37280
May 20, 1970 Japan..................45/43578

[52] U.S. Cl. ...................226/149, 226/165, 352/166
[51] Int. Cl. ..........................................B65h 17/36
[58] Field of Search ......226/165, 166, 149; 352/166, 352/186, 188, 194

[56] References Cited

UNITED STATES PATENTS

| | | | |
|---|---|---|---|
| 1,851,448 | 3/1932 | Ross | 352/194 |
| 3,361,316 | 1/1968 | Krause | 226/149 |

Primary Examiner—Richard A. Schacher
Attorney—Stanley Wolder

[57] ABSTRACT

A device comprises a pressure plate for pressing the roll film against an apertured plate under the control of a first cam to be driven in operative relationship with the rotation of drive means, clamp and transport members at least one of which is operated by a second cam to be driven in operative relationship with the first cam to clamp the roll film and which advance the film by a predetermined amount under the control of a third cam to be driven in similar operative relationship, and a mechanism for effecting a single turn of rotation for driving and stopping the first, second and third cams for every single frame transport of the film. The shape and timing of action of the first, second and third cams are so determined that the roll film is automatically advanced by only one frame when it is released from the pressure plate.

4 Claims, 6 Drawing Figures

Inventors
KAORU UMEDA KENJIRO ISHII
HIROSHI ENDO
By
Attorney

DEVICE FOR INTERMITTENTLY TRANSPORTING ROLL FILM

BACKGROUND OF THE INVENTION

The present invention relates to a device for intermittently transporting a non-perforation roll film, more particularly to a device for intermittently transporting a roll film suitable for use with microfilm cameras.

Although the unperforated roll film has an advantage of permitting a more efficient utilization of the film size, it is difficult to transport such film with accuracy and arrangement of the frames not infrequently involves errors and irregularity in spaces between the frames. Particularly with frictional transport devices employing pinch rollers which have heretofore been used widely in microfilm cameras or the like, slippage is frequently experienced or the pinch rollers undergo a marked wear. In fact deterioration of frictional force or the like attributable to aging phenomenon results in an inevitable drawback of errors in the amount of transport. Device of conventional type has another drawback that an accurate intermittent transport can not be achieved due to the difficulty involved in instantaneously relieving driving force from the film and initiating the operation of transport stopping member at the very position where the film has just been advanced. To sum up, with cameras such as microfilm cameras employing the unperforated roll film, improvements of the intermittent film transport device has been one of the important problems.

SUMMARY OF THE INVENTION

An object of the present invention is to provide a device for intermittently transporting an unperforated roll film with a uniform space between adjacent frames of the roll film.

Another object of the present invention is to provide a device which is simple in structure, free from wear on the film transport mechanism and highly durable over a prolonged period of use.

Another object of the present invention is to provide a device for automatically effecting single-frame film transport which can be operated in operative relationship with and subsequent to an exposure action made upon depression of push button.

Another object of the present invention is to completely eliminate possible slippage between the transport member and the film due to abrupt advance or sudden stoppage upon initiation or termination of film transport so as to ensure a constant amount of transport all the time.

Still another object of the present invention is to prevent above-mentioned slippage and thereby eliminate possible marring on the film surface.

In a camera such as microfilm camera for use with an unperforated roll film, the device of the present invention is characterized by a structure comprising a pressure plate for pressing the roll film against an apertured plate under the control of a first cam to be driven in operative relationship with the rotation of drive means, clamp and feed members at least one of which is operated by a second cam to be driven in operative relationship with the first cam to clamp the roll film and which advance the film by a predetermined amount under the control of a third cam to be driven in operative relationship with the first and second cams, and a mechanism for effecting a single turn of rotation for driving and stopping the first, second and third cams for every single-frame transport of the film, the shape and timing of action of the first, second and third cams being so determined that the clamp and feed members free the roll film from clamping engagement therewith after the pressure plate has pressed the roll film, clamp the roll film therebetween before the pressure plate is released from the roll film, advance the roll film by a predetermined amount after the pressure plate has been released from the roll film, and are returned to the position where the clamp and feed members are located prior to the advancing movement, after the roll film has been freed from the clamping engagement with the clamp and feed members.

For single-frame film transport, the present invention as described above, instead of employing frictional rotation means such as pinch rollers as with conventional devices, incorporates clamp and feed members which are operated by cams whereby the film is clamped at a desired portion and advanced a predetermined amount. Since the distance of film transport is thus determined by the shape of the cams, the roll film can be advanced by an accurate amount all the time. Furthermore the clamp and release actions by the clamp and feed members, effected in operative relation with the pressing and release actions of the pressure plate, are achieved with accurate timing free from errors.

The contact between the roll film and the above-mentioned operation members which is entirely free from sliding friction causes no wear on the clamp and feed members, ensuring improved durability. The structure wherein the actions of the clamp and feed members upon initiation and termination of film transport operation are all controlled by cams formed in predetermined shape serves to eliminate accidental slippage which would otherwise take place due to sudden advancing movement or stoppage as well as marring on the film surface resulting from abrasive contact.

The automatic single-frame film transport is further achieved in operative relation with exposure making operation by providing, in the electric circuit for automatic exposure in the camera, a switch which is operated by a mechanism for rotating the first, second and third cams by a single turn and which turns on and off the electric circuit of the drive means for the cams.

Other objects and features of the present invention will become more apparent from the following description of an embodiment of this invention with reference to the accompanying drawings.

DESCRIPTION OF THE PREFERRED EMBODIMENT

Figure 1:
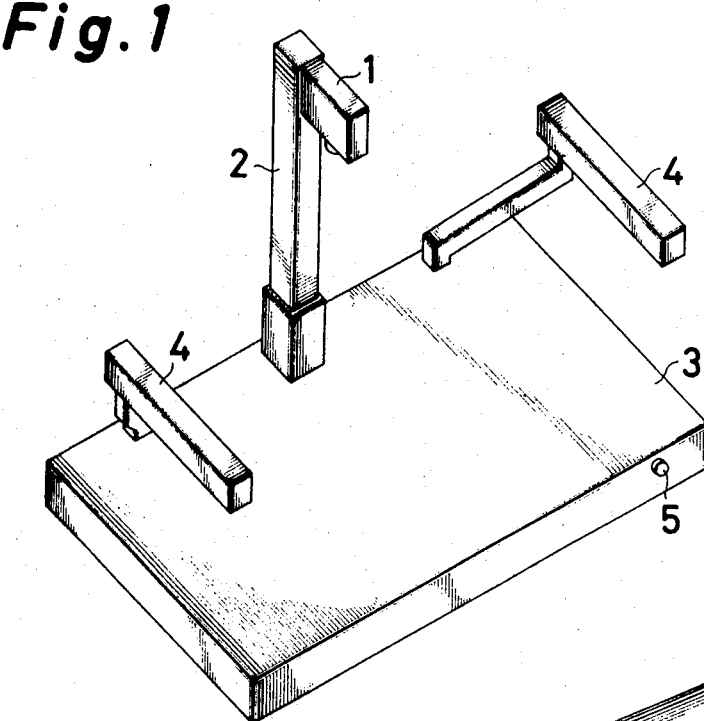
FIG. 1 is a perspective view showing an embodiment of a photographing device employing a microfilm camera to which the present invention is applied.

FIG. 1 shows a microfilm camera of the portable type to be mounted above a table and a device for microfilming. A camera 1 is mounted on a support 2 at its front portion in vertically movable manner. The support 2 is detachably mounted on a table 3, on which, in addition to the support 2, illuminating lamps 4 are also detachable mounted at an adjustable angle so as to illuminate an unillustrated subject on the table 3 at a desired angle.

Figure 4:
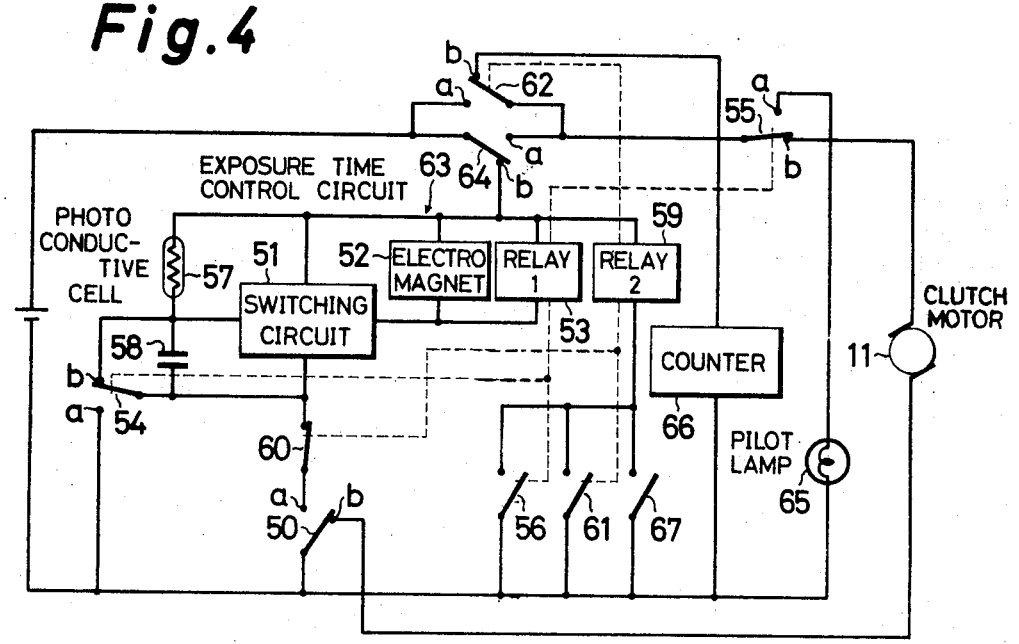
FIG. 4 is a diagram of an electric circuit for automatic exposure which can be applied to a microfilm camera.

The table 3 further includes at its front face a push button switch 5 for initiating photographing operation, whereby an electric circuit for automatic exposure, such as shown in FIG. 4 and disposed in the interior, is actuated into operation to automatically control the exposure effecting mechanism of the camera.

Figure 2:
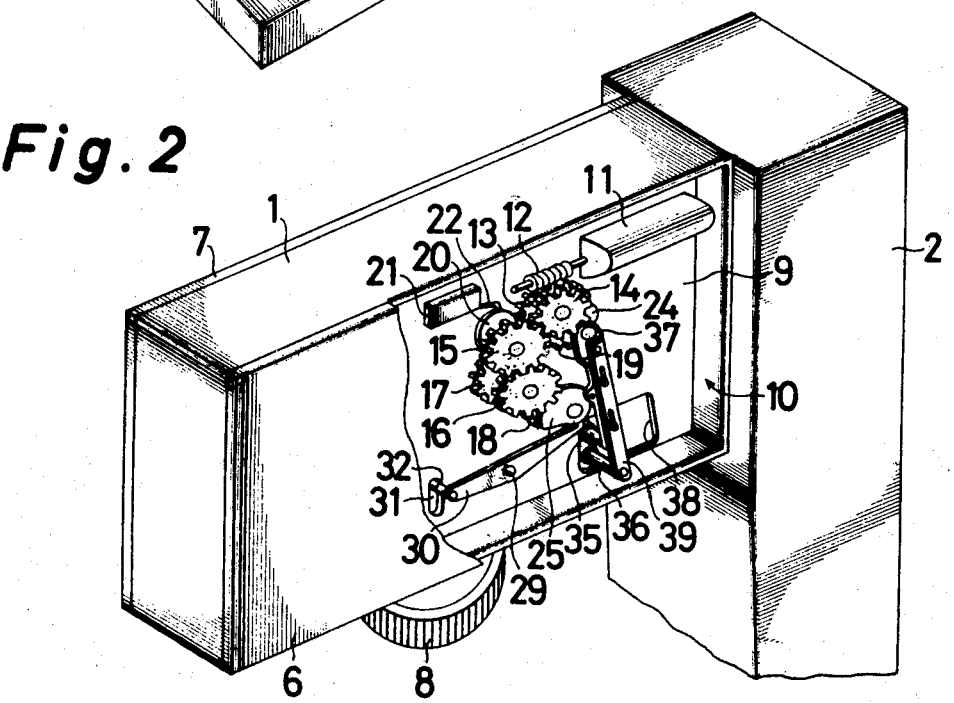
FIG. 2 is a perspective view with part broken away showing an embodiment of the present invention which is incorporated in the microfilm camera.

As seen in FIG. 2, the camera 1 mounted on the support 2 has a taking lens 8 whose lens barrel is shown in the drawing and which is in facing relation to the table 3 illustrated in FIG. 1, the interior of the camera being devided into two compartments by a base plate 9. As apparent from the drawing, one of the compartments serves as a film transport mechanism compartment 10 and the other as a film magazine compartment (not shown).

Secured to the base plate 9 is a compact clutch motor 11, with its output shaft carrying a worm 12 in meshing engagement with a worm wheel 13 to drive the same.

A pinion 14 adapted to be rotated integrally with the worm wheel 13 drives intermediate gears 15, 16 and 17 mounted on shafts on the base plate 9. In this embodiment, the intermediate gears 15, 16 and 17 are adapted for rotation at the same speed. Gears 18 and 19 mounted on shafts on the base plate 9 and meshing with the intermediate gear 17 are driven at the same speed as the intermediate gear 17.

A disc cam 20, integral with the intermediate gear 15 for rotation, actuates the actuator 22 of a microswitch 21 every time the disc cam 20 makes a turn of rotation to thereby actuate a switch of an electric circuit (FIG. 4) to be described later and open or close the circuit of the clutch motor 11. More specifically, every turn of the intermediate gears 15, 16, 17 and gears 18, 19 de-energizes the clutch motor 11. Thus, the disc cam 20, intermediate gears 15, 16, 17 and gears 18, 19 constitute a mechanism for effecting single turn of rotation. The intermediate gear 17 and gears 18 and 19 are driven in the directions of arrows shown in FIG. 3.

The gear 18 is coaxial with a first cam 23 and a third cam 25 to drive both cams 23 and 25 integrally therewith. The gear 19 is coaxial with a second cam 24 to drive the cam 24 integrally therewith.

Figure 3:
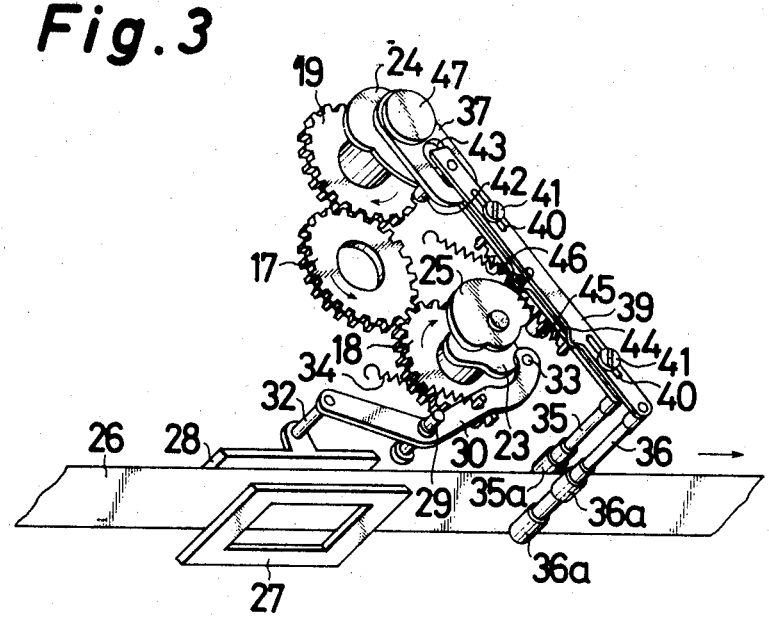
FIG. 3 is a perspective view on an enlarged scale showing the clamp and transport mechanism for a roll film in FIG. 2.

An unperforated roll film 26 housed in the film magazine compartment is advanced in the direction of the arrow of FIG. 3. An apertured plate 27 centered on the optical axis of the taking lens determines the format of the roll film 26. The roll film 26 is disposed behind the apertured plate 27, and in the rear of the film 26 there is disposed a pressure plate 28 which presses the roll film 26 against the apertured plate 27 when so required.

The pressure plate 28 is pivotally mounted on a support rod 32 extending from one end of a lever 30 on a pivot 29 on the base plate 9 into the film magazine compartment through a slot 31 in the base plate 9 as seen in FIG. 2.

Extending from the other end of the lever 30 is a pin 33 kept in sliding contact with the periphery of the first cam 23 under the action of a spring 34 acting on the lever 30 in one direction. Accordingly, rotation of the first cam 23 causes the pressure plate 28 to press the roll film 26 against the apertured plate 27 and release the same therefrom.

Disposed forwardly of the apertured plate 27 in the film transport direction are a feed member 35 and a clamp member 36 for clamping the roll film 26 which are respectively provided with covering members 35a and 36a made of rubber or like material having suitable frictional property so as to protect the film surfaces from marring.

The feed member 35 extends from the distal end of an arm 37 into the film magazine compartment through a window 38 in the base plate 9, with the covering members 35a positioned behind the rear face of the roll film 26. The arm 37 is mounted at its base portion on the shaft of the gear 19 and second cam 24 and adapted for pivotal movement independently of the gear 19 and cam 24. On the other hand the clamp member 36 extends from the distal end of a slide arm 39 into the film magazine compartment through the window 38 in the base plate 9 as is the case with the feed member, with its covering members 36a positioned in front of the roll film 26.

As shown in the drawing, the slide arm 39 lies on the arm 37 and is adapted for movement longitudinally of the arm 37 by means of a guide slot 40 and a guide pin 41. A pin 42 extending from the base end of the arm 39 through a slot 43 in the base portion of the arm 37 is brought into sliding contact with the periphery of the cam 24 by a spring 44 provided between the arm 37 and the slide arm 39. Thus the second cam 24, when rotated, moves the slide arm 39 slidably on the arm 37 along the guide pin 41 to operate the clamp member 36, which in turn clamps the roll film 26 in cooperation with the feed member 35 for film transport. The film is freed from the clamping engagement when the clamp member 36 is returned.

The arm 37 is provided at a suitable position with a pin 45 which is disposed close to the periphery of the third cam 25 to be rotated along with the gear 18. Under the action of the spring 46 which urges the arm 37 toward one direction, the pin 45 is kept in sliding contact with the third cam 25. The rotation of the third cam 25 therefore causes the arm 37 and the slide arm 39 thereon to move pivotally about the pivot 47 of the arm 37 to transport the roll film 26 and bring both arms back after the roll film is released as described above.

FIG. 4 shows an embodiment of an electric circuit for automatic exposure for the microfilm camera. When the push button switch 5 on the front face of the table 3 is depressed, an exposure switch 50 is disengaged from terminal b and connected to terminal a. A switching circuit 51 is closed when the exposure switch 50 is closed at its terminal a to energize an electromagnet 52 and a first relay 53.

The electromagnet 52, when thus energized, attracts a shutter blade actuating means to initiate exposure, while the first relay 53 energized operates the switch 54, 55 and 56, whereupon the switch 54 is opened at its terminal b and closed at its terminal a. As a result, charging on a capacitor 58 is initiated through a photoconductive cell 57 whose resistivity varies in accordance with the amount of light received, and the switching circuit 51 is connected to the power source through the terminal a on the switch 54. Thus even when the push button switch 5 is freed from depression and the exposure switch 50 is returned to the terminal b before an automatic exposure is completed, the first relay 53 is kept energized through the switching circuit 51 and switch 54 until the switching circuit 51 is turned off. When operated as described previously, the switch 55 is opened at its terminal b and closed at terminal a.

The energization of the first relay 53 further causes the switch 56 to close the circuit of a second relay 59 to energize the second relay 59, which in turn opens a double exposure prevention switch 60 and closes a self-maintaining switch 61. The relay 59 also moves the switch 62 from terminal a to terminal b.

With the double exposure prevention switch in OFF position and the self-maintaining switch 61 in ON position, the exposure switch 50 is cut off from an exposure time control circuit 63 consisting of switching circuit 51, electromagnet 52, first relay 53 photoconductive cell 57 and capacitor 58. Accordingly, when the voltage charged on the capacitor 58 reaches the same level as the actuating voltage preset for the switching circuit 51 while the push button 5 is on, causing the switching circuit 51 to turn off and thereby de-energizing the first relay 53 to connect the switch 54 to the terminal b, there is no possibility of discharge of the capacitor through the switch 54. The fact that the switching circuit 51 in this position remains in OFF position serves to eliminate the possible objection that current flows throught the electromagnet 52 and the first relay 53 to permit a double exposure or that the operation described above is repeated to give rise to oscillation. Since the second relay 59 keeps the self-maintaining switch 61 in ON position, it remains energized until a transport control switch 64 to be described later is turned off even if the first relay 53 is de-energized upon turning off of the switching circuit 51.

The switch 62, when closed at contact a, turns on a pilot lamp 65 through the switch 55 which is closed at contact a by the first relay 53, permitting the lamp to indicate that the exposure time control circuit 63 is in operation for exposure.

Now the capacitor 58 is charged in accordance with the value of resistivity of the photoconductive cell 57 included in the exposure time control circuit 63, namely with the amount of light received by the cell until the voltage thereon reaches the same level as the preset voltage level for actuating the switching circuit 51, whereupon the switching circuit 51 is turned off to de-energize the electromagnet 52 to free the shutter blades for completion of exposure. At the same time, the first relay 53 is de-energized to move the switch 54 from contact a to contact b, and the switch 55 is moved from contact a to contact b to turn off the pilot lamp 65. The switch 56 is also turned off. However, the second relay 59 is retained in energized state by the self-maintaining switch 61.

In this state, the push button switch 5 has been freed from depression, with the exposure switch 50 returned to the terminal b. Or when the push button switch 5 is freed from depression upon completion of exposure to return the exposure switch 50 to the terminal b, the clutch motor 11 (see FIGS. 2 and 4) will be energized to initiate film transport operation through the worm 12.

The transport control switch 64 is coupled with the microswitch 21 to be actuated by the cam 20 driven by the clutch motor 11. As already described with reference to FIG. 2, the microswitch 21 is switched on and off by its actuator 22 which is operated by the cam 20 during its rotation. More specifically, the clutch motor 11, when energized, drives the cam 20 and the first, second, third cams 23, 24, 25 for driving operation members described and, just before the cams 20, 23, 24 and 25 complete almost one turn of rotation, the cam 20 pushes up the actuator 22 of the microswitch 21, whereupon the transport control switch 64 is opened at terminal b and closed at terminal a to turn off the electric circuit of the second relay 59 for deenergization. Consequently, the double exposure prevention switch 60 is closed, the self-maintaining switch 61 is opened, and the switch 62 is closed again at the terminal b. The closing of the switch 62 at terminal b completes the circuit of a counter 66 through the transport control switch 64 and advances the indication on the counter 66 by one division further.

With the transport control switch 64 closed at terminal a, the clutch motor 11 continues to rotate even after the switch 62 is disengaged from its terminal a. Through exactly one turn of rotation of the cam 20 and first, second, third cams 23, 24, 25, the transport control switch 64 is returned to the terminal b to open the electric circuit of the clutch motor 11. The motor is now brought to a halt and transport operation is terminated. At the same time, the electric circuit of the counter 66 is also opened.

A switch 67 is one to be operated for transporting the film to the position of the first exposure and for effecting final winding up operation, the operating portion therefor being mounted at a suitable position on the table 3 or camera 1. Closing the switch 67 energizes the second relay 59, which in turn closes the switch 62 at terminal *a* to close the circuit of the clutch motor 11 and energize the motor 11. The cam 20 and first, second, third cams 23, 24, 25 are therefore driven for film transport operation as already described. At this time, just before the cam 20 completes one turn of rotation, the transport control switch 64 opens the electric circuit of the second relay 59, allowing the switch 62 to move to terminal *b*, but since the circuit of the clutch motor is closed now with the transport control switch 64 closed at its terminal *a*, the clutch motor 11 continues to rotate. When the cam 20 has completed exactly one turn of rotation, the transport control switch 64 is closed again at its terminal *b* and the electric circuit of the clutch motor 11 is opened. Continuous depression on the switch 67, however, permits current to flow through the second relay 59, with the result that the switch 62 is moved to its terminal *a* to close the electric circuit of the motor 11 to effect rotation of the motor. In this manner by depressing the switch 67 continuously, a desired number of frames can be wound up without operating the exposure time control circuit 63. Although the double exposure prevention switch 60 and self-maintaining switch 61 will function upon energization of the second relay 59 during the above winding operation, the operation of these switches takes place entirely independently of film winding and exposure operation, hence no objection. In the case where the switch 67 is turned off during the movement of the cam 20 to actuate the transport control switch 64, the self-maintaining switch 61 brings the second relay 59 into self-maintaining state, allowing the cam 20 to stop accurately at the position where the cam is to be positioned immediately after the transport control switch 64 is moved to its terminal *a* and then subsequently moved back to its terminal *b* again.

The film transport operation effected by the first, second and third cams 23, 24, 25 will be described with reference to FIGS. 5 and 6.

Since the clutch motor 11 is de-energized upon completion of one turn of the cam 20 through the action of the cam 20 shown in FIG. 2 and the microswitch 21 and the above operation will subsequently be repeated after completion of exposure upon depression of push button switch 5, the movement of the first, second, third cams 23, 24, 25 is a cyclic motion produced by a mechanism for effecting single turn of rotation. The action of the cams during one cycle will therefore be described below.

Figure 5:
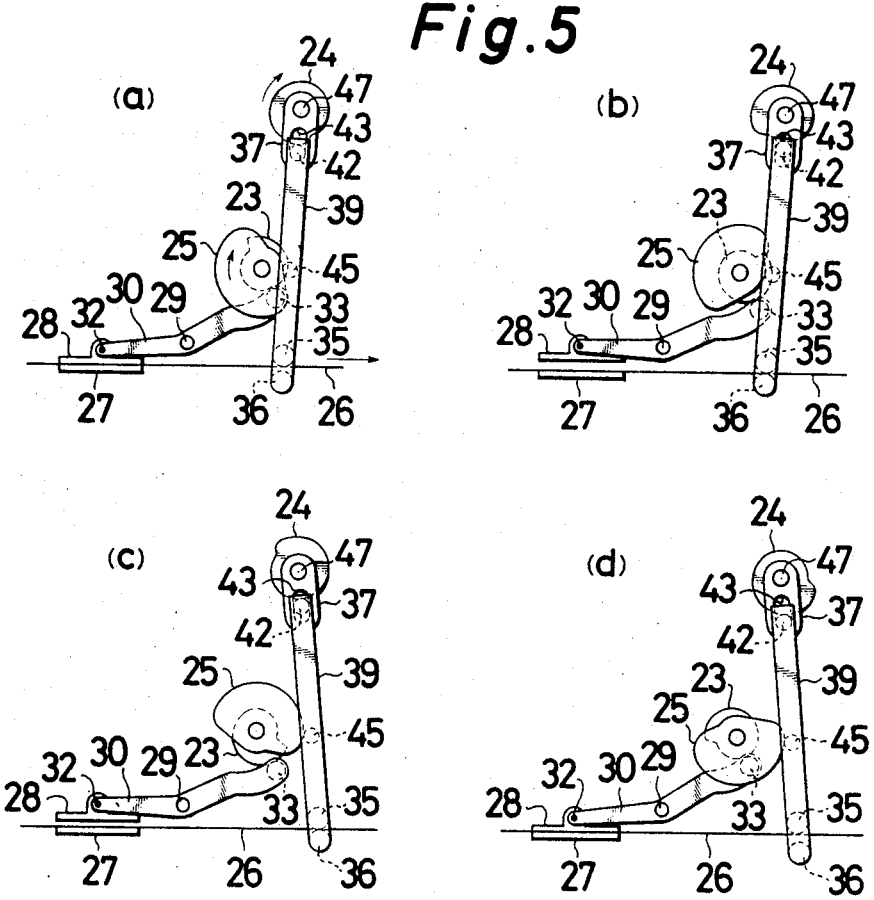
FIGS. 5 (a), (b), (c) and (d) are schematic plan view showing the respective stages of movement of the constituent members, FIG. 5 (a) illustrating clamp and feed members as they are positioned immediately after a roll film has been loaded on a camera or immediately after these members have been returned to the position where they are to be initiated into advancing movement upon completion of single-frame transport operation, FIG. 5 (b) showing the clamp and feed members as they are ready for advancing movement for film transport, FIG. 5 (c) showing the clamp and feed members as they are positioned upon completion of film transport movement, FIG. 5 (d) showing the clamp and feed members just before they are returned to the state illustrated in FIG. 5 (a)
Figure 6:
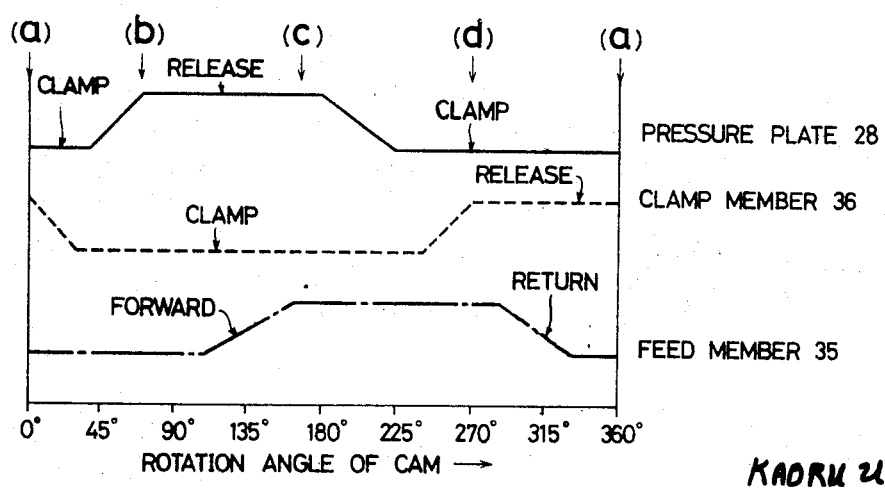
FIG. 6 is a diagram showing one cycle of movement of the principal members including respective stages of movement corresponding to those shown in FIGS. 5 (a), (b), (c) and (d).

FIGS. 5 (a), (b), (c) and (d) are plan views showing the positions of the cams and associated members at representative stages during one cycle of movement, and FIG. 6 is a diagram showing the movement of the pressure plate 28, feed member 35 and clamp member 36 during one cycle of movement, the diagram showing the timing of action of the illustrated embodiment in corresponding relationship with the rotation angle of the cams. Each of the FIGS. 5 (a) to (d) shows each stage of movement as referred to in FIG. 6 by the same reference character.

It will be apparent from FIG. 6 that the pressure plate 28 and clamp member 36 perform pressing or clamp action and release action only once during one cycle. The shape and timing of action of the first and second cams 23 and 24 are so determined that the clamp member 36 releases the roll film 26 after the film has been pressed by the pressure plate 28 and clamps the film 26 before it is released from the pressure plate 28. Thus the clamp and transport mechanism is so designed that the roll film 26 is pressed or clamped at least at one portion during one cycle of the operation.

Likewise, the feed member 35 is adapted to move reciprocally only once in transporting the roll film 26 by one frame. (Although the feed member 35 and clamp member 36 are moved reciprocally at the same time for film transport operation, such movement is represented only by the movement of the feed member 35 for the convenience of description.) The shape and timing of action of the first, second, third cams are such that the arm 37 is pivotally moved about the pivot 47 to advance the roll film 26 by a predetermined amount after the pressure plate 28 has been released from the film by the rotation of the first cam 23 driven by means of the clutch motor 11 and the gear system and that the feed member 35 is returned after the clamp member 36 has been released from the film due to the rotation of the second cam 24.

Accordingly, subsequent to loading of the roll film 26 in the camera which bring the operation members to the state illustrated in FIG. 5 (a), the action of the second cam 24 due to the rotation of the clutch motor 11 brings the clamp member 36 into clamping engagement with the roll film 26 and the first cam 23 than permits the pressure plate 28 to move out of pressing contact with the film (FIG. 5 (b) ), this being followed by the pivotal movement of the arm 37 about the pivot 47 under the action of the cam 25, which advances the feed member 35 to transport the roll film 26 by one frame (FIG. 5 (c) ). Subsequent to this, the movement of the first cam 23 brings the pressure plate 28 into pressing contact with the film 26 and the movement of the second cam 24 thereafter releases the clamp member 36 from the film 26 (FIG. 5 (d) ), whereupon the feed member 35 is moved back to the original position (FIG. 5 (a) ) in contact with the third cam 25. In this way, one cycle of movement is completed. While the pressure plate 28 presses the roll film 26 against the apertured plate 27, photographing operation is of course performed separately upon depression of the push button switch 5 under the control of the exposure time control circuit such shown in FIG. 4. With a camera employing the device shown in FIG. 4, the roll film is automatically advanced by one frame upon completion of exposure.

The feed member 35 and clamp member 36 in accordance with this invention are less susceptible to wear than rotary pinch rollers, and even when worn the members ensure reliable film transport in cooperation with the pressure plate 28 with accurate spacing and free of slippage and possible damage to the film.

Suitable modifications may be made for the pressure plate 28, feed member 35, clamp member 36, and first, second, third cams 23, 24, 25 for controlling pressing, clamping and transport actions for the roll film 26. For example, both feed member and clamp member may be adapted for movement in the direction of clamping action on the roll film. The mechanism for effecting a single turn of rotation may function to initiate or terminate the operation of the associated members at some other position than that in the present embodiment. Alternatively, the intended function may by provided by means already known in the art. These modifications may of course be included in the principle of this invention.

We claim:

1. In a camera such as microfilm camera for use with an unperforated roll film, a device for intermittently transporting a roll film comprising a pressure plate for pressing the roll film against an apertured plate under the control of a first cam to be driven in operative relationship with the rotation of drive means, clamp and feed members in combination with each other at least one of which is operated by a second cam to be driven in operative relationship with the first cam to clamp the roll film, the clamp and feed members being adapted to advance the film by a predetermined amount under the control of a third cam to be driven in operative relationship with the first and second cams, and a mechanism for effecting a single turn of rotation and stopping to drive and stop the first, second and third cams every time the film is to be transported by one frame, the shape and timing of action of the first, second and third cams being so determined that the clamp and feed members free the roll film from clamping engagement therewith after the pressure plate has pressed the roll film, clamp the roll film therebetween before the pressure plate is released from the roll film, advance the roll film by a predetermined amount in clamping engagement therewith after the pressure plate has been released from the roll film, and are returned to the position where the clamp and feed members are located prior to the advancing movement, after the roll film has been freed from the clamping engagement with the clamp and feed members.

2. The device as set forth in claim 1 wherein said mechanism for effecting a single turn of rotation and stopping comprises a cam adapted to be driven by the drive means through a gear system at the same speed as each of the first, second and third cams and a switch adapted to turn on and off the electric circuit of the drive means by one turn of rotation of the cams.

3. The device as set forth in claim 2 wherein the switch for turning on and off the electric circuit of the drive means is adapted to function in operative relationship with an exposure time control circuit of the camera so as to automatically close the electric circuit of the drive means upon completion of an automatic exposure under the control of the control circuit and to open the electric circuit of the drive means after a predetermined amount of the roll film has been completely transported.

4. The device as set forth in claim 3 wherein the operation circuit of the switch for turning on and off the electric circuit of the drive means includes a manually operated switch for closing the electric circuit of the drive means independently of the operation of the exposure time control circuit of the camera.

* * * * *